United States Patent
Meyer et al.

(10) Patent No.: US 11,593,171 B2
(45) Date of Patent: Feb. 28, 2023

(54) RESERVATION-BASED HIGH-PERFORMANCE COMPUTING SYSTEM AND METHOD

(71) Applicant: Raytheon Company, Waltham, MA (US)

(72) Inventors: Douglas A. Meyer, Tucson, AZ (US); John D. Stone, Tucson, AZ (US); Dudley F. Spooner, II, Vail, AZ (US); Ryan L. Bird, Vail, AZ (US); Amzie L. McWhorter, Benson, AZ (US)

(73) Assignee: Raytheon Company, Waltham, MA (US)

( * ) Notice: Subject to any disclaimer, the term of this patent is extended or adjusted under 35 U.S.C. 154(b) by 391 days.

(21) Appl. No.: 16/773,262

(22) Filed: Jan. 27, 2020

(65) Prior Publication Data
US 2021/0232432 A1    Jul. 29, 2021

(51) Int. Cl.
G06F 9/50 (2006.01)
G06F 9/48 (2006.01)

(52) U.S. Cl.
CPC .......... G06F 9/5027 (2013.01); G06F 9/4881 (2013.01)

(58) Field of Classification Search
None
See application file for complete search history.

(56) References Cited

U.S. PATENT DOCUMENTS

| | | | |
|---|---|---|---|
| 4,947,477 A | | 8/1990 | Little |
| 5,349,643 A | * | 9/1994 | Cox ...................... G06F 21/575 |
| | | | 713/162 |
| 6,272,637 B1 | | 8/2001 | Little et al. |
| 7,788,477 B1 | | 8/2010 | Huang et al. |
| 8,010,542 B2 | | 8/2011 | Ussery et al. |
| 2004/0088414 A1 | * | 5/2004 | Flynn .................... G06F 9/5044 |
| | | | 709/201 |

(Continued)

OTHER PUBLICATIONS

Chakode et al; "High Performance Computing on Demand: Sharing and Mutualization of Clusters"; IEEE 2010; (Chakode_2010.pdf; pp. 126-133) (Year: 2010).*

(Continued)

*Primary Examiner* — Hiren P Patel

(57) ABSTRACT

A method includes communicatively coupling a shared computing resource to core computing resources associated with a first project. The core computing resources associated with the first project are configured to use the shared computing resource to perform data processing operations associated with the first project. The method also includes reassigning the shared computing resource to a second project by (i) powering down the shared computing resource, (ii) disconnecting the shared computing resource from the core computing resources associated with the first project, (iii) communicatively coupling the shared computing resource to core computing resources associated with the second project, and (iv) powering up the shared computing resource. The core computing resources associated with the second project are configured to use the shared computing resource to perform data processing operations associated with the second project. The shared computing resource lacks non-volatile memory to store data related to the first and second projects.

20 Claims, 5 Drawing Sheets

(56) References Cited

U.S. PATENT DOCUMENTS

| | | | |
|---|---|---|---|
| 2008/0189715 A1* | 8/2008 | Armstrong | G06F 13/4081 |
| | | | 718/104 |
| 2009/0132797 A1* | 5/2009 | Lo | G06F 9/4416 |
| | | | 713/2 |
| 2012/0096468 A1* | 4/2012 | Chakravorty | G06F 9/50 |
| | | | 718/103 |
| 2019/0384649 A1* | 12/2019 | Wen | G06F 9/445 |

OTHER PUBLICATIONS

Buyya et al.; "Cloud computing and emerging IT platforms: Vision, hype, and reality for delivering computing as the 5th utility"; 2008 Elsevier B. V. (Buyya_2008.pdf; pp. 599-616) (Year: 2008).*

Shrek, "PC Gaming 101: How to Upgrade Your Graphics Card", MSI, Jul. 2015, 10 pages.

International Search Report dated Oct. 13, 2020 in connection with International Patent Application No. PCT/US2020/023305, 4 pages.

Written Opinion of the International Searching Authority dated Oct. 13, 2020 in connection with International Patent Application No. PCT/US2020/023305, 8 pages.

"NIST Cloud Computing Standards Roadmap," NIST Special Publication 500-291, Version 2, National Institute of Standards and Technology, Jul. 2013, 114 pages.

* cited by examiner

# RESERVATION-BASED HIGH-PERFORMANCE COMPUTING SYSTEM AND METHOD

TECHNICAL FIELD

This disclosure is generally directed to computing systems. More specifically, this disclosure is directed to a reservation-based high-performance computing system and method.

BACKGROUND

It is often necessary or desirable for high-performance computing resources (such as high-performance servers or graphics processing units) to be used at different times by different parties. For example, the sharing of computing resources may be necessitated by the fact that high-performance computing resources are often expensive to purchase and operate, so sharing the use of the computing resources over time can help to distribute their costs across multiple parties. Also, many parties who require or desire the use of high-performance computing resources do not need to use the computing resources at all times, so sharing the use of the computing resources over time can help to increase the overall usage of the computing resources.

SUMMARY

This disclosure relates to a reservation-based high-performance computing system and method.

In a first embodiment, a method includes communicatively coupling a shared computing resource to core computing resources associated with a first project. The core computing resources associated with the first project are configured to use the shared computing resource to perform data processing operations associated with the first project. The method also includes reassigning the shared computing resource to a second project by (i) powering down the shared computing resource, (ii) disconnecting the shared computing resource from the core computing resources associated with the first project, (iii) communicatively coupling the shared computing resource to core computing resources associated with the second project, and (iv) powering up the shared computing resource. The core computing resources associated with the second project are configured to use the shared computing resource to perform data processing operations associated with the second project. The shared computing resource lacks non-volatile memory to store data related to the first and second projects. The shared computing resource and the core computing resources associated with the first project collectively form at least part of a first computing cluster. The shared computing resource and the core computing resources associated with the second project collectively form at least part of a second computing cluster.

In a second embodiment, a system includes a shared computing resource. The system also includes core computing resources associated with a first project and configured to use the shared computing resource to perform data processing operations associated with the first project. The system further includes core computing resources associated with a second project and configured to use the shared computing resource to perform data processing operations associated with the second project. The shared computing resource is configured to be (i) communicatively coupled to the core computing resources associated with the first project, (ii) powered down and disconnected from the core computing resources associated with the first project, and (iii) communicatively coupled to the core computing resources associated with the second project and powered up to reassign the shared computing resource. The shared computing resource lacks non-volatile memory to store data related to the first and second projects. The shared computing resource and the core computing resources associated with the first project collectively form at least part of a first computing cluster. The shared computing resource and the core computing resources associated with the second project collectively form at least part of a second computing cluster.

In a third embodiment, a system includes multiple sets of core computing resources associated with and dedicated to different projects, where each set of core computing resources is configured to perform data processing operations for the associated project. The system also includes multiple shared computing resources each configured to be selectively assigned to one of the different projects and to perform data processing operations for the assigned project. Each shared computing resource is configured to be (i) communicatively coupled to the set of core computing resources associated with a first of the projects, (ii) powered down and disconnected from the set of core computing resources associated with the first project, and (iii) communicatively coupled to the set of core computing resources associated with a second of the projects and powered up to reassign the shared computing resource. Each shared computing resource lacks non-volatile memory to store data related to the projects. Each set of core computing resources and the shared computing resources communicatively coupled to that set of core computing resources form of a computing cluster. Each computing cluster is reconfigurable by changing the shared computing resources communicatively coupled to the set of core computing resources.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
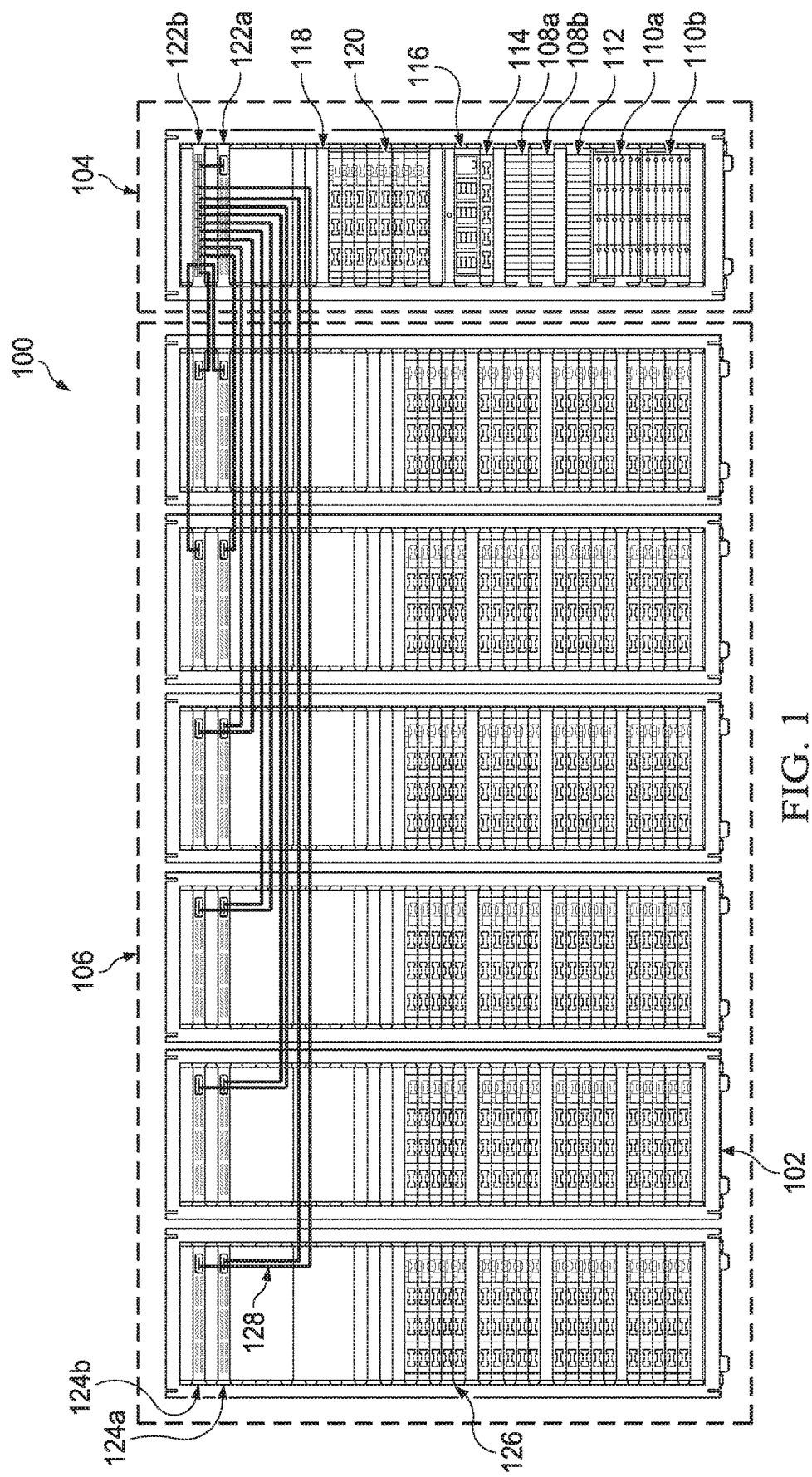
FIG. 1 illustrates an example computing cluster that is usable in a reservation-based high-performance computing system according to this disclosure.

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, it is often necessary or desirable for high-performance computing resources (such as high-performance servers or graphics processing units) to be used at different times by different parties. Among other reasons, this may be done to help spread the costs of the high-performance computing resources across multiple parties or to help increase the overall usage of the high-performance computing resources. However, one issue that arises with the use of shared high-performance computing resources or other computing resources is data security. That is, governments and private organizations constantly seek to protect their confidential information and are often required to do so, which creates problems when computing resources are shared. This is because data associated with one party that is stored in a shared computing resource might be accessible by another party using the shared computing resource without proper precautions. This is also a common problem in cloud computing environments, where the actual computing nodes used for processing data can change over time.

In some cases, there are strict guidelines in place as to what procedures need to occur before a shared computing resource used by one party can be transferred to and used by another party. For example, it is common for different commercial contractors working for a governmental agency to share computing resources, and security rules are often in place regarding the movement of classified systems between different "need to know" (NTK) environments. These types of rules can also impact a single organization, such as when different divisions or other units of the same company share computing resources for different governmental projects.

Often times, these security rules require the "sanitization" of hard disk drives or other non-volatile storage devices (typically by wiping stored data via overwriting) or the physical replacement of hard drives or other non-volatile storage devices in computing nodes. Sanitization records also typically need to be created for the various non-volatile storage devices in order to identify the specific steps taken to sanitize the storage devices. Moreover, obtaining permission to transfer computing resources often requires multiple levels of security authorization, as well as changes to the hardware inventories of the computing systems that are gaining and losing the computing resources being transferred. The entire security review process may be prolonged (possibly weeks or even months) depending on various factors, such as workload and the projects or data involved. Thus, numerous procedural requirements, long documentation, and multi-step approval processes can interfere with the reuse of equipment across closed area boundaries, which is arduous and prevents fast responses to changing needs. To make matters worse, different governmental agencies often have different requirements when it comes to shared computing resources. In addition, huge amounts of raw data needed for auditing purposes may be generated in relation to shared resources, even if different projects can be successfully integrated into a single network.

Other approaches for sharing computing resources often center around the logical separation of the computing resources via virtualization or the establishment of virtual local area networks (VLANs). However, virtualization lacks the protections associated with the physical separation of the computing resources. Also, virtualization may not be suitable for use in some applications, such as when governmental rules or regulations require physical separation of computing resources (which is common for computing resources involved with classified or sensitive data processing projects).

As a result of these and other issues, computing resources may typically be assigned to a particular project for the lifetime of that project, regardless of whether the computing resources are fully utilized by that project. Also, people and organizations are often reluctant to release computing resources for use by others, even if those computing resources are not being fully utilized, since there may be significant delays down the road when the computing resources are needed again.

This disclosure provides various techniques for reservation-based high-performance computing. As described in more detail below, a computing system architecture includes one or more shared computing resources that support at least one information system, which can be easily sanitized and which can be quickly reassigned to different projects. Among other things, the computing system architecture removes or omits hard disk drives (HDDs) and any other user-writable non-volatile storage devices from the one or more shared computing resources. In some instances, only volatile storage is used in the one or more shared computing resources. Other components of the computing system architecture use high-speed servers or other processing devices that can access and store or retrieve data to or from the one or more shared computing resources while emulating local storage of data, such as for operating system files and other local files. Data in the volatile storage of the one or more shared computing resources can be easily cleared, which facilitates compliance with various governmental security rules or other data security requirements.

In some embodiments, this type of computing system architecture includes multiple computing clusters, each of which is generally divided into two types of components. The first type of component represents the "brawn" of the computing cluster and includes server blades, computing engines, and other computing resources that are sharable between different computing clusters. No hard drives and other user-writable non-volatile storage devices are included in the shared computing resources. These are the components that can be shared between different projects and that can be easily cleared in terms of data when necessary. The second type of component represents the "brain" or core of the computing cluster and may include file servers, management servers, diskless image servers, or other core computing resources, at least some of which interact with or support the use of the shared computing resource(s). These are the components that can be assigned to individual projects and that are not shared between projects, so these components can include hard drives or other user-writable non-volatile storage devices that can store data on a more permanent basis. At least some of the core computing resources can have low-latency high-bandwidth connections to the shared computing resources, and these connections can be changed as needed to assign the shared computing resources to the core computing resources of different projects.

Often times, shared computing resources and core computing resources are physically placed in different racks, and specific shared computing resources can be (temporarily) assigned to specific projects by appropriate coupling of the racks of shared computing resources to the racks of core computing resources. For example, when a rack containing a shared computing resource is identified for assignment to the information system of a particular project, a standardized procedure to be followed can include powering down the shared resource in the rack, inspecting the shared resource to ensure that the shared resource has actually powered down (thus losing all data since it contains only volatile memory), disconnecting network connection(s) from the shared resource to the prior project's core computing resources, and connecting network connection(s) from the shared resource to the new project's core computing resources. In some instances, at least one diskless image server in the new project can support the remote booting of servers or other computing nodes in the shared computing resource, and a management server in the new project can integrate the shared computing resource into a pool for use by the new project's core computing resources. This type of process can be completed much more quickly compared to other approaches. Also, a reservation system that is based on anticipated workloads (and possibly supported by performance metrics) may be used to identify when shared computing resources should be assigned and reassigned for use by different projects.

In this way, shared computing resources can be assigned and reassigned as needed to support different projects, even if those projects have strict security rules to prevent the sharing of data (thereby being suitable for use in NTK environments). Shared computing resources used in classified, sensitive, or other projects can be moved much more quickly, such as within hours. Among other things, this enables the quick and easy assignment and reassignment of shared computing resources to new or short-term projects or to critical but temporary "surge" needs. Also, this can be accomplished without requiring the movement of hard drives into and out of the shared computing resources, and there may be no need to modify the hardware inventory of each project that uses the shared computing resources since the shared computing resources may include their own information systems. Moreover, this can be accomplished without requiring the use of virtualization (which is typically associated with performance degradation and has significant auditing requirements) and without requiring changes to underlying system data processing operations (since the emulation of local data storage can be provided). Further, a baseline of shared computing resources available for "tenancy" (meaning they are able to be shared) can be tracked as part of a dedicated information system, enabling shared resources to be monitored, released, and reclaimed as needed. In addition, this approach can be used at different levels in a computing system, such as at the workstation level or at the server level (or both). This can be useful in various situations, such as when diskless operation is used to support a system that includes computing nodes like classified desktops and computing servers.

FIG. 1 illustrates an example computing cluster 100 that is usable in a reservation-based high-performance computing system according to this disclosure. As shown in FIG. 1, the computing cluster 100 includes various computing resources that are housed in a number of racks 102. Each rack 102 can have any suitable size, shape, and dimensions, and each rack 102 can be configured to hold any number of computing resources. Also, each rack 102 may include at least one power distribution unit, which can be used to distribute electrical power to the computing resources in the rack 102. Each power distribution unit may be configured to provide any suitable amount of electrical power, such as 15 kW to 24 kW of power. In some embodiments, each rack 102 may include multiple redundant power distribution units. Note, however, that computing resources may be housed and powered in any suitable manner.

The computing cluster 100 is divided into core computing resources 104 and shared computing resources 106. The core computing resources 104 generally represent computing nodes that are assigned to a particular project and that are not shared between projects (at least not easily). As a result, the core computing resources 104 include hard disk drives or other user-writable non-volatile storage devices that are used to persistently store project-related data. In contrast, the shared computing resources 106 generally represent computing nodes that may be assigned to different projects at different times. As a result, the shared computing resources 106 lack hard disk drives and other user-writable non-volatile storage devices. In some embodiments, the shared computing resources 106 may include only volatile storage devices that are used to store project-related data. With this division, the shared computing resources 106 may be used to perform a significant portion or all of the data processing computations for the assigned project, and the core computing resources 104 may be used to provide intelligence and control to support the operations of the shared computing resources 106 and to provide data retention capabilities for the associated project.

The specific types of computing nodes used in the core computing resources 104 and the shared computing resources 106 can vary widely based on the application. The following represents examples of the types of computing nodes that may be used in the core computing resources 104 and the shared computing resources 106. However, other or additional types of computing nodes may be used in the core computing resources 104 and in the shared computing resources 106.

The core computing resources 104 may include one or more management servers 108a-108b. The management servers 108a-108b are configured to provide various functionality to help manage the operation of the core computing resources 104 and the overall computing cluster 100. For example, the management servers 108a-108b may execute or otherwise provide a processing job scheduler, which can receive processing jobs submitted by engineers or other personnel and provide the processing jobs to a batch queueing system. The batch queueing system assigns the processing jobs to particular computing resources (such as the shared computing resources 106) for execution. The batch queueing system may assign the processing jobs to the computing resources in any suitable manner, such as based on user-defined requirements. Among other things, this allows "around the clock" processing of jobs, including processing jobs that might not start until late at night and that may be completed before personnel arrive at work in the morning. The management servers 108a-108b may also perform or otherwise provide metrics monitoring for various core and shared computing resources 104, 106, which allows the management servers 108a-108b (and engineers or other personnel who interact with the management servers 108a-108b) to monitor the performance of the computing resources 104, 106 over time.

The management servers 108a-108b may further provide boot services for "diskless" computing nodes. A diskless computing node generally represents a computing device in which required boot information is maintained on the management servers 108a-108b. This may occur, for example, when the diskless computing node represents a shared computing resource 106 that lacks a non-volatile storage for the boot information. The boot information maintained on the management servers 108a-108b for each diskless computing node may include information such as a system address, a shared read-only copy of an operating system, and unique files required for the diskless computing node (such as log and configuration files). Each diskless computing node may automatically request an address and boot to a fully operational state by interacting with the management servers 108a-108b, which can eliminate the need for local hard drives in the diskless computing nodes.

In this example, there are multiple management servers 108a-108b used in the core computing resources 104. More specifically, two management servers 108a-108b are used in this example. The presence of multiple management servers 108a-108b may allow for a first management server 108a-108b to operate in a primary mode, while a second management server 108b-108a may operate in a backup or secondary mode and be prepared to take over the primary role if the first management server fails or experiences some other fault. Of course, a single management server may be used, or multiple management servers may operate in any other suitable manner.

The core computing resources 104 may also include one or more scratch servers 110a-110b, 112. Each scratch server 110a-110b, 112 represents a file server that includes a number of non-volatile storage devices (such as hard disk drives or solid-state drives), and each file server is typically large with high reliability. The scratch servers 110a-110b, 112 also typically operate using high-speed network connections to enable the rapid transport of data into and out of the scratch servers 110a-110b, 112. Among other things, the scratch servers 110a-110b, 112 can be used to store and facilitate retrieval of data that is used, generated, collected, or otherwise associated with the computing operations performed by the shared computing resources 106. As a particular example, the scratch servers 110a-110b, 112 can be used to store and facilitate retrieval of simulation input files used by the shared computing resources 106 and simulation output files generated by the shared computing resources 106.

In this example, the scratch servers 110a-110b, 112 include write-heavy (WH) scratch servers 110a-110b and a read-heavy (RH) scratch server 112. As the names imply, the write-heavy scratch servers 110a-110b are used to store data that is written more often, while the read-heavy scratch server 112 is used to store data that is read more often. Thus, for example, the read-heavy scratch server 112 may store data that changes infrequently, such as common data that is repeatedly read and used by the shared computing resources 106 to perform processing operations. This type of data may require little or no backups, such as when the data is in an archive and can be easily replaced in the event that the read-heavy scratch server 112 fails. In contrast, the write-heavy scratch servers 110a-110b may store data that changes more frequently, such as data that is generated by the shared computing resources 106 during the performance of processing operations. This type of data separation between the scratch servers can help to reduce the load placed on the write-heavy scratch servers 110a-110b. Note that while two write-heavy scratch servers 110a-110b and one read-heavy scratch server 112 are shown in FIG. 1, this is for illustration only. Also note that the separation of data in write-heavy and read-heavy scratch servers 110a-110b, 112 is not required, and one or more scratch servers may be used for all data. In addition, note that multiple scratch servers may be used in any suitable manner, such as independently or in a redundant configuration.

The core computing resources 104 may further include at least one session server 114. Each session server 114 represents a computing node that supports remote login of engineers or other personnel. Each session server 110 can also support high-speed access to at least some of the scratch servers 110a-110b, 112. Each session server 110 may allow personnel to set up, submit, and monitor the execution of processing jobs and to engage in post-processing operations using generated data (such as data reduction and review). In some cases, a session server 114 may represent a workstation or other computing node configured to support multiple simultaneous users. The session server 114 may include a large amount of memory, support high processing workloads, and provide extremely fast access to the scratch servers 110a-110b, 112.

In some applications, the computing cluster 100 may be expected to operate under high loads around the clock, and the write-heavy scratch servers 110a-110b may be similarly active. As such, the write-heavy scratch servers 110a-110b may not have the traditional idle time of other servers, so the write-heavy scratch servers 110a-110b may not be configured for disaster recovery backups (as that would slow the servers 110a-110b or be hindered by the normal activity of the servers 110a-110b). In those situations, data is at risk of loss in the event of a critical system failure. Thus, engineers or other personnel can review processing job data on the scratch servers 110a-110b via the session server 114, post-process the data, and copy the results to more permanent storage devices (not shown here).

The core computing resources 104 may also include at least one virtual desktop infrastructure (VDI) server 116. The VDI server 116 can host virtualized desktop environments, such as desktop environments used on workstations of users associated with the computing cluster 100. In some embodiments, the VDI server 116 can host various types of virtualized desktop environments, such as WINDOWS and LINUX desktop environments. Through the use of virtualization, multiple user sessions can be kept separate, without access to the larger global memory space and multiple processing cores that would be available on a traditional session server.

The core computing resources 104 may optionally include at least one optical drive 118, which represents a drive configured to read data from (and possibly write data to) one or more optical discs. The core computing resources 104 may also optionally include one or more working computing nodes 120, which may represent the same type(s) of computing node(s) used in the shared computing resources 106. Thus, the working computing nodes 120 may lack hard disk drives and any other user-writable non-volatile storage devices. In some embodiments, the working computing nodes 120 may include only volatile storage devices. The working computing nodes 120 may be used to perform data processing operations as needed by a project, and the working computing nodes 120 can be booted using the management servers 108a-108b as described above. In some cases, the working computing nodes 120 may represent server blades each containing one or more processors and a suitable amount of volatile memory. Each working computing node 120 may include or support an Intelligent Platform Management Interface (IPMI) or other suitable interface that allows remote system management of the working computing node 120. As a particular example, the IPMI may be used to mount an image of an operating system for a working computing node 120, where the image is provided by the management servers 108a-108b. In other cases, the working computing nodes 120 may represent graphics processing units designed to provide specialized image-related data processing operations.

The presence of the working computing nodes 120 in the core computing resources 104 allows some data processing functionality to be provided regardless of whether there are shared computing resources 106 coupled to the core computing resources 104. Often times, the working computing nodes 120 can be used in the core computing resources 104 when the rack(s) 102 containing the core computing resources 104 have empty or available space. Note, however, that the working computing nodes 120 can be omitted from the core computing resources 104, such as when the functionality of the working computing nodes 120 is not needed or when there is no available space in the rack(s) 102 holding the core computing resources 104.

In addition, the core computing resources 104 may include one or more networking switches 122a-122b, which can be used to communicatively couple the core computing resources 104 to each other and to shared computing resources 106 (if any). In this example, there are two networking switches 122a-122b used with the core computing resources 104. The first networking switch 122a may include a number of Ethernet ports, which can be coupled to the various components 108a-108b, 110a-110b, 112, 114, 116, 118, 120 using Ethernet connections. The first networking switch 122a may also include several optical ports, which can be coupled to the second networking switch 122b using at least one fiber optic connection. The second networking switch 122b may include a number of optical ports, which can be coupled to the first networking switch 122a and to the shared computing resources 106 using fiber optic connections. Note that in some cases, at least the connections between the second networking switch 122b and the shared computing resources 106 can be formed using redundant fiber optic connections or other redundant connections. Connections between the first networking switch 122a and the various components 108a-108b, 110a-110b, 112, 114, 116, 118, 120 and the connection between the networking switches 122a-122b may or may not be formed using redundant connections.

Note that the number(s) and type(s) of networking switches 122a-122b can vary based on a number of factors, such as the number of nodes coupled to the switches and the types of connections being used. Also note that the use of optical and Ethernet connections here is for illustration only, and any suitable connections may be made involving the nodes of the core computing resources 104.

Each rack 102 containing shared computing resources 106 may include one or more networking switches 124a-124b, which can be used to communicatively couple the shared computing resources 106 in the rack 102 to the core computing resources 104 (and possibly to each other). In this example, there are two networking switches 124a-124b used in each rack 102 of shared computing resources 106. Each networking switch 124a-124b may include a number of Ethernet ports, which can be coupled to the shared computing resources 106 in the rack 102 using Ethernet connections. Each networking switch 124a-124b may also include several optical ports, which can be coupled to the core computing resources 104 using fiber optic connections. In some cases, the networking switches 124a-124b are configured as a redundant pair so that communication with the core computing resources 104 is not lost if one of the networking switches 124a-124b or one of the fiber optic connections fails or experiences some other fault. Again, note that the use of optical and Ethernet connections here is for illustration only, and any suitable connections may be made involving the nodes of the shared computing resources 106.

Each rack 102 containing shared computing resources 106 also includes computing nodes that are sharable between different sets of core computing resources 104 associated with different projects. In this example, all of the racks 102 containing the shared computing resources 106 have the same type of computing node, namely working computing nodes 126. The working computing nodes 126 may lack hard disk drives and any other user-writable non-volatile storage devices. In some embodiments, the working computing nodes 126 may include only volatile storage devices. The working computing nodes 126 may be used to perform data processing operations as needed by a project, and the working computing nodes 126 can be booted using the management servers 108a-108b as described above. In some cases, the working computing nodes 126 may represent server blades each containing one or more processors and a suitable amount of volatile memory. Each working computing node 126 may include an IPMI or other suitable interface that allows remote system management of the working computing node 126. In other cases, the working computing nodes 126 may represent graphics processing units designed to provide specialized image-related data processing operations. Note that the number of working computing nodes 126 can vary as needed or desired.

In this example, various cables 128 are used to form the connections between the core computing resources 104 and the shared computing resources 106. For example, the cables 128 may include fiber optic connections or other types of high-speed connections between the core computing resources 104 and the shared computing resources 106. As noted above, there may or may not be redundant cables 128 between the rack(s) 102 containing the core computing resources 104 and the rack(s) 102 containing the shared computing resources 106.

As can be seen in FIG. 1, the core computing resources 104 can be easily connected to and disconnected from the shared computing resources 106. For example, assume that a rack 102 containing shared computing resources 106 is currently coupled to a rack containing the core computing resources for a different project (not shown in FIG. 1). The rack 102 containing the shared computing resources 106 can be powered down, and an inspection can occur to verify that the shared computing resources 106 are no longer receiving operating power. When the shared computing resources 106 lack any type of user-writable non-volatile storage (such as when the shared computing resources 106 contain only volatile memory like random access memory), this causes all data in the shared computing resources 106 to be lost. The rack 102 containing the shared computing resources 106 can be disconnected from the rack containing the core computing resources for the different project, and one or more cables 128 can be used to connect the rack 102 containing the shared computing resources 106 to the rack 102 containing the core computing resources 104 in FIG. 1. The shared computing resources 106 can be powered back on, and the shared computing resources 106 then become available for use by the core computing resources 104 for the newly-assigned project.

This approach allows shared computing resources 106 to be assigned and reassigned much more quickly compared to prior approaches while still maintaining data security between projects. Moreover, this approach avoids the need to repeatedly sanitize a large number of hard drives or other non-volatile storage devices. For instance, if the shared computing resources 106 here include one hundred and twenty eight working computing nodes 126 each with a single hard drive, transferring the shared computing resources 106 from one project to another would require wiping or replacing one hundred and twenty eight hard drives, along with creation of suitable sanitization records for those hard drives. By removing or omitting the non-volatile memory from the working computing nodes 126 and configuring the core computing resources 104 to use the working computing nodes 126, this approach can eliminate the need to wipe or replace hard drives in the shared computing resources 106.

Although FIG. 1 illustrates one example of a computing cluster 100 that is usable in a reservation-based high-performance computing system, various changes may be made to FIG. 1. For example, each of the core computing resources 104 and the shared computing resources 106 may occupy any number of racks 102. Also, the actual computing nodes forming the core computing resources 104 and the shared computing resources 106 may vary as needed or desired, and computing nodes other than or in addition to the types of computing nodes described above may be used here. As a particular example, the core computing resources 104 may include a "flip KVM" module that includes an integrated keyboard, video display, and mouse, where the KVM module can be connected to any node in the core computing resources 104 to support local maintenance activity.

Figure 2:
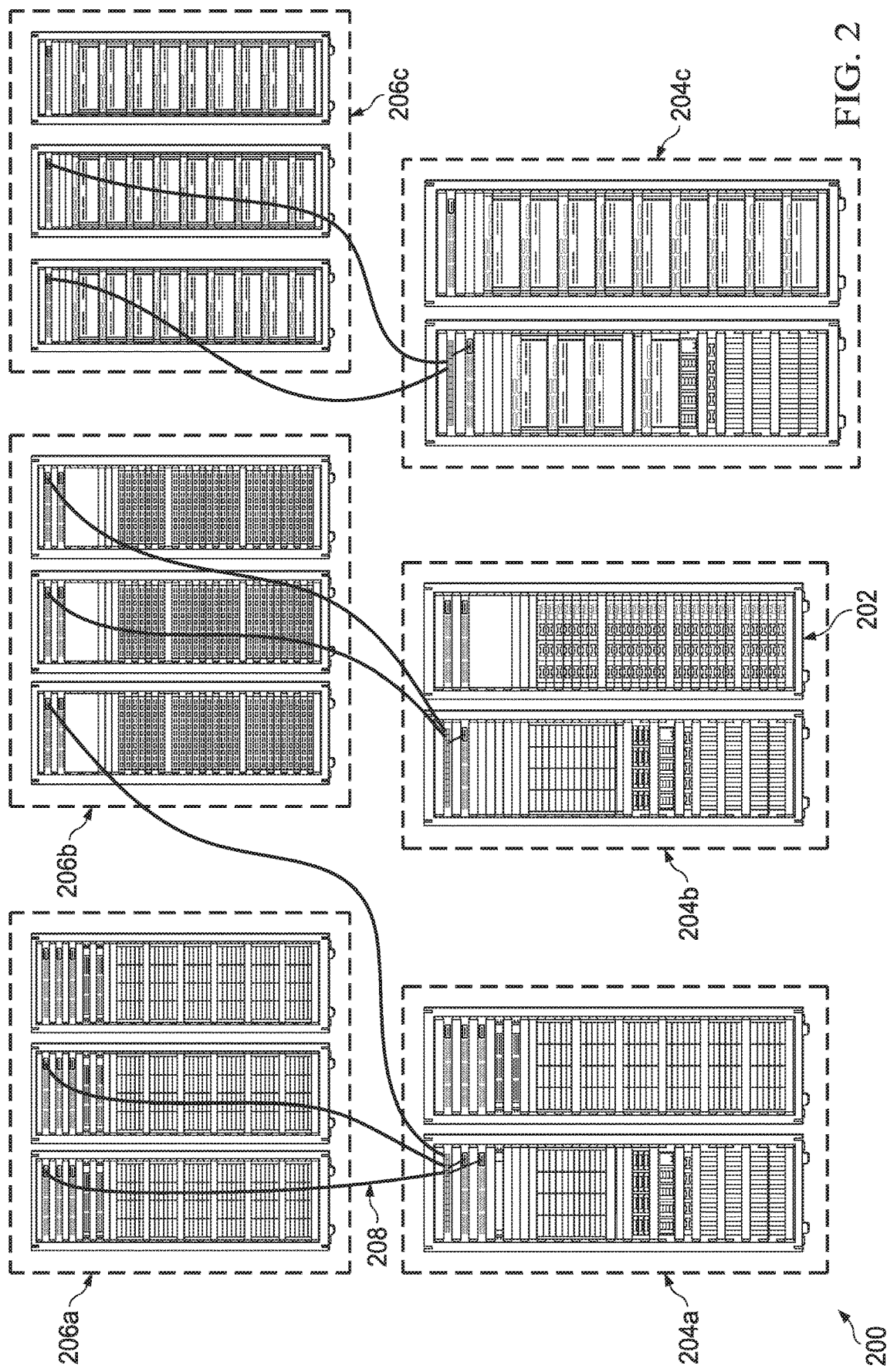
FIG. 2 illustrates an example reservation-based high-performance computing system that includes one or more reconfigurable computing clusters according to this disclosure.

FIG. 2 illustrates an example reservation-based high-performance computing system 200 that includes one or more reconfigurable computing clusters according to this disclosure. As shown in FIG. 2, the computing system 200 includes various computing resources that are housed in a number of racks 202. Again, each rack 202 can have any suitable size, shape, and dimensions, and each rack 202 can be configured to hold any number of computing resources. Also, each rack 202 may include at least one power distribution unit, which can be used to distribute electrical power to the computing resources in the rack 202. Each power distribution unit may be configured to provide any suitable amount of electrical power, and each rack 202 may include multiple redundant power distribution units. Note, however, that computing resources may be housed and powered in any suitable manner.

In this example, there are three sets of core computing resources 204a-204c and three sets of shared computing resources 206a-206c. The different sets of core computing resources 204a-204c generally represent computing nodes that are assigned to particular projects and that are not shared between the projects. Thus, for instance, the core computing resources 204a can be associated with a first project, the core computing resources 204b can be associated with a second project, and core computing resources 204c can be associated with a third project. In order to comply with governmental security rules or other requirements, there may be no connections between the core computing resources 204a-204c. Also, the core computing resources 204a-204c may be air-gapped, meaning the core computing resources 204a-204c have no connections to any unsecured networks (such as the Internet).

Each set of core computing resources 204a-204c includes any suitable computing nodes that are assigned to a particular project. In this example, each set of core computing resources 204a-204c is housed in a pair of racks 202. One rack 202 in each set of core computing resources 204a-204c may include some or all of the computing nodes described above with respect to the core computing resources 104, and another rack 202 in each set of core computing resources 204a-204c may include additional computing nodes (such as additional nodes 120) dedicated to a particular project. Note, however, that any suitable arrangement of computing nodes in racks 202 may be used.

Different sets of core computing resources 204a-204c may have different numbers and types of computing nodes, depending on the needs of the associated projects. For example, one set of core computing resources 204a may include a large number of server computing nodes, another set of core computing resources 204b may include fewer server computing nodes and a number of graphics processing units, and yet another set of core computing resources 204c may include a large number of graphics processing units. Each set of core computing resources 204a-204c may typically include one or more management servers, one or more scratch servers, one or more session servers, and possibly other components described above (although some of these components may be omitted in specific implementations).

Similarly, each set of shared computing resources 206a-206c includes any suitable computing nodes that can be shared among multiple projects. In this particular example, each set of shared computing resources 206a-206c is housed in three racks 202, although the number of racks 202 can vary as needed or desired. The different sets of shared computing resources 206a-206c may include different types of computing nodes that can be shared among the multiple projects. For example, one set of shared computing resources 206a may include a large number of server computing nodes, another set of shared computing resources 206b may include fewer server computing nodes and a number of graphics processing units, and yet another set of shared computing resources 206c may include a large number of graphics processing units.

Various cables 208 are used to couple the core computing resources 204a-204c to the desired shared computing resources 206a-206c. The cables 208 may, for example, represent fiber optic connections or other suitable high-speed data connections between computing resources. Again, there may or may not be redundant cables 208 between the rack(s) 202 containing the core computing resources 204a-204c and the rack(s) 202 containing the shared computing resources 206a-206c.

As can be seen in FIG. 2, different projects have different computing needs and may therefore be coupled to different shared computing resources. For example, the set of core computing resources 204a here is coupled to two racks 202 in the set of shared computing resources 206a and to a single rack 202 in the set of shared computing resources 206b. This provides the set of core computing resources 204a with a large number of server computing nodes and a limited number of graphics processing units. The set of core computing resources 204b here is coupled to two racks 202 in the set of shared computing resources 206b. This provides the set of core computing resources 204b with fewer server computing nodes but more graphics processing units relative to the set of core computing resources 204a. The set of core computing resources 204c here is coupled to two racks 202 in the set of shared computing resources 206c. This provides the set of core computing resources 204c with even fewer server computing nodes but even more graphics processing units relative to the sets of core computing resources 204a-204b.

Figure 3:
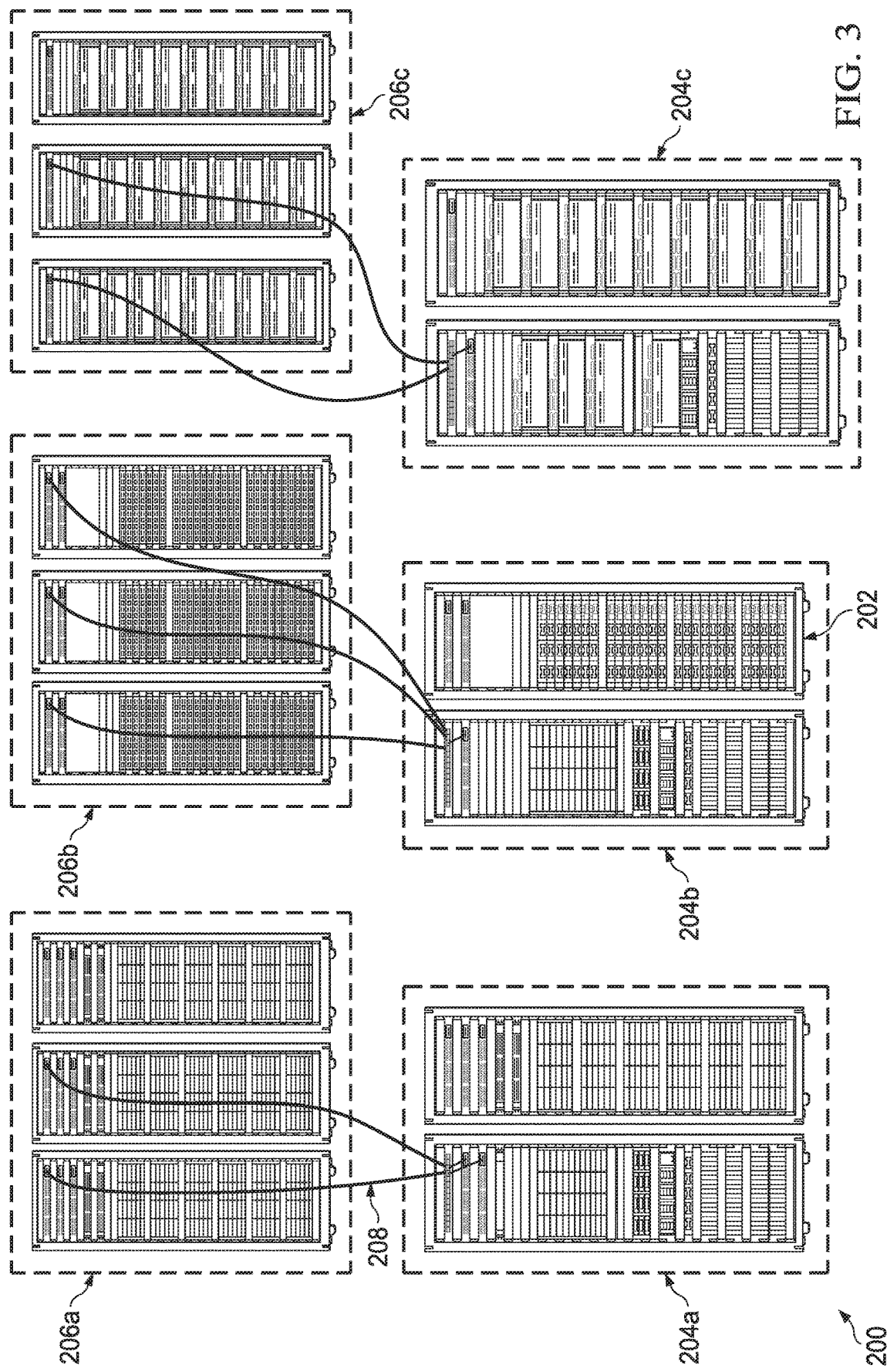
FIG. 3 illustrates an example reconfiguration of the reservation-based high-performance computing system of FIG. 2 according to this disclosure.

FIG. 3 illustrates an example reconfiguration of the reservation-based high-performance computing system 200 of FIG. 2 according to this disclosure. In this example, it is assumed that the project associated with the core computing resources 204b requires the use of the rack 202 in the shared computing resources 206b previously used by the core computing resources 204a. This may occur for various reasons, such as a transient need by the core computing resources 204b or completion of a processing task for the core computing resources 204a. For whatever reason, the shared computing resources 206b previously used by the core computing resources 204a can be shut down and inspected. The shared computing resources 206b previously used by the core computing resources 204a can be disconnected from the core computing resources 204a and connected to the core computing resources 204b, and those shared computing resources 206b can be powered on for use with the shared computing resources 206b. In this way, shared computing resources can be easily assigned and reassigned to different projects as needed.

In FIGS. 2 and 3, each computing cluster is defined by one of the sets of core computing resources 204a-204c, plus any of the shared computing resources 206a-206c that are connected to that set of core computing resources 204a-204c. As a result, each computing cluster is reconfigurable and can change over time as the shared computing resources used with that computing cluster change. Moreover, the computing system 200 can be "reservation-based" because it is possible for different projects to reserve specific shared computing resources as needed, and reserved shared computing resources can be easily transferred between the core computing resources 204a-204c according to such reservations. In some cases, reservations for shared computing resources can be based on anticipated workloads of the core computing resources 204a-204c over time and can be supported by performance metrics of the core computing resources 204a-204c.

Although FIG. 2 illustrates one example of a reservation-based high-performance computing system 200 that includes one or more reconfigurable computing clusters and FIG. 3 illustrates one example reconfiguration of the reservation-based high-performance computing system 200 of FIG. 2, various changes may be made to FIGS. 2 and 3. For example, the computing system 200 may include any suitable number and sets of core computing resources and any suitable number and sets of shared computing resources. Also, the computing system 200 may include any suitable connections between core and shared computing resources.

Figure 4:
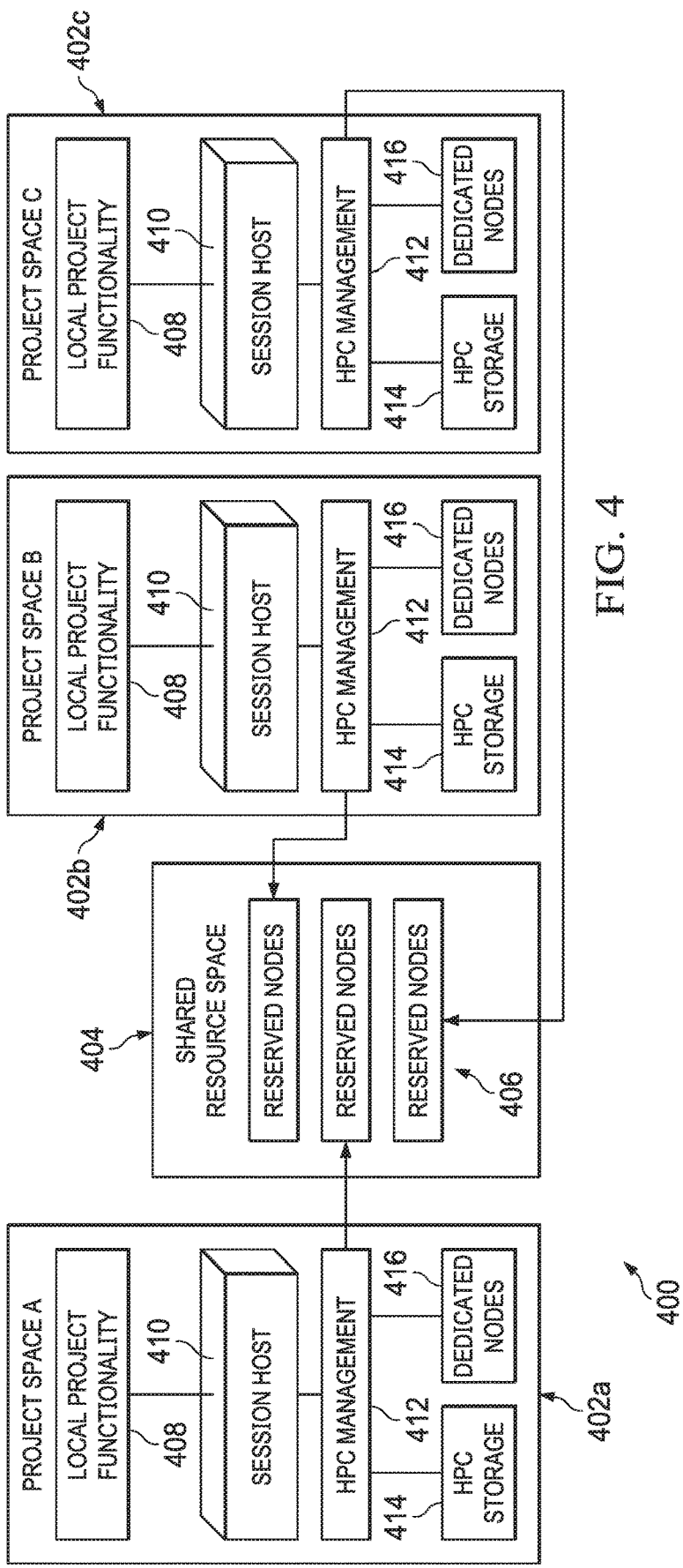
FIG. 4 illustrates an example functional architecture supporting a reservation-based high-performance computing system according to this disclosure.

FIG. 4 illustrates an example functional architecture 400 supporting a reservation-based high-performance computing system according to this disclosure. For ease of explanation, the functional architecture 400 shown in FIG. 4 may be described as being used in the computing system 200 of FIGS. 2 and 3, which may include multiple instances of the computing cluster 100 in FIG. 1. However, the functional architecture 400 shown in FIG. 4 may be used in any suitable system and with any suitable computing cluster(s).

As shown in FIG. 4, the functional architecture 400 here includes one or more project spaces 402a-402c and one or more shared resource spaces 404. Each project space 402a-402c generally represents the functionality associated with a particular project. For example, each project space 402a-402c may represent the functionality of the associated set of core computing resources 204a-204c for a specific project. Each shared resource space 404 generally represents the functionality associated with shared computing resources. For instance, the shared resource space 404 may represent the functionality of one or more sets of shared computing resources 206a-206c. In this example, the shared resource space 404 is defined at least partially by various computing nodes 406, which can be reserved by or assigned to different ones of the project spaces 402a-402c as needed or desired.

Note that each project space 402a-402c may reserve or be assigned any suitable number of computing nodes 406 (whether equal or unequal), and the number of computing nodes 406 reserved by each project space 402a-402c can vary (possibly significantly) over time.

Each project space 402a-402c includes local project functionality 408, which generally represents functionality provided to or performed by engineers or other personnel associated with a project. For example, the local project functionality 408 may represent the functionality of workstations or other local computers used by the engineers or other personnel associated with a project. A session host 410 represents functionality that allows personnel to remotely login and access core computing resources. For instance, the session host 410 may represent the functionality provided by the session server 110 forming a part of the core computing resources.

A high-performance computing (HPC) management function 412 is used to support interactions with any reserved computing nodes 406 in the shared resource space 404 that have been assigned to a particular project or project space. For example, the HPC management function 412 may represent the functionality provided by the management servers 108a-108b and scratch servers 110a-110b, 112 forming a part of the core computing resources. Among other things, the HPC management function 412 can support emulation or other functions that cause the reserved computing nodes 406 to appear as local nodes within the associated project space 402a-402c or otherwise support the use of the reserved computing nodes 406 in the associated project space 402a-402c. The HPC management function 412 can also detect when additional reserved computing nodes 406 are assigned and connected to the project space 402a-402c and can support use of those additional reserved computing nodes 406 in the project space 402a-402c. In addition, the HPC management function 412 can detect when certain reserved computing nodes 406 are reassigned and disconnected from the project space 402a-402c and can remove those additional reserved computing nodes 406 from the project space 402a-402c. In this way, the HPC management function 412 can support the transient use of shared computing resources without requiring modification to other components of the project space 402a-402c.

The HPC management function 412 may also provide access to an HPC storage 414 and may support the use of one or more dedicated computing nodes 416. The HPC storage 414 represents one or more storage devices into which information from the shared resource space 404 (or data based on the information from the shared resource space 404) can be stored. For example, as noted above, engineers or other personnel can review processing job data on the scratch servers 110a-110b via the session server 114, post-process the data, and copy the results to more permanent storage. The HPC storage 414 here represents at least one storage device into which the results or other data can be moved. Also, as noted above, some core computing resources may include dedicated computing resources for performing certain functions, such as when the core computing resources 104 includes one or more working computing nodes 120. These resources represent the dedicated computing nodes 416, and the HPC management function 412 can provide access to those dedicated computing nodes 416. The HPC management function 412 can also store information from the dedicated computing nodes 416 (or data based on the information from the dedicated computing nodes 416) in the HPC storage 414.

Although FIG. 4 illustrates one example of a functional architecture 400 supporting a reservation-based high-performance computing system, various changes may be made to FIG. 4. For example, the functional architecture 400 may include any suitable number of project spaces and any suitable number of shared resource spaces. Also, different project spaces may have different functional components and arrangements of functional components, and different shared resource spaces may have different numbers and types of shared computing resources.

Figure 5:
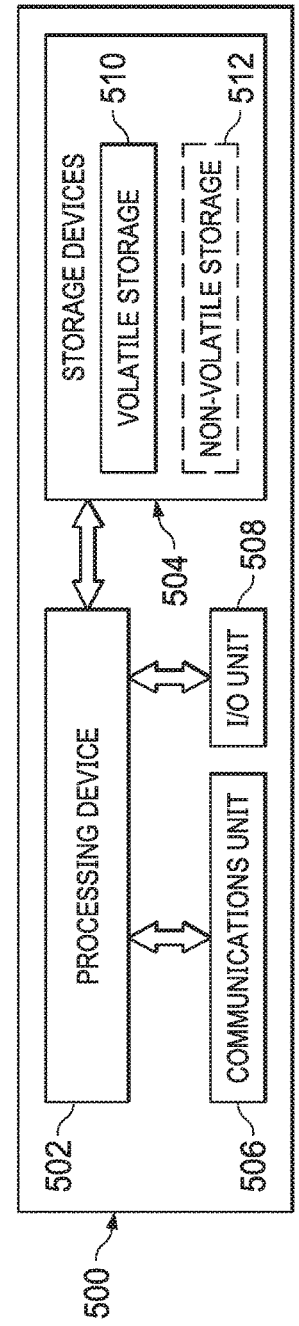
FIG. 5 illustrates an example computing node in a reservation-based high-performance computing system according to this disclosure.

FIG. 5 illustrates an example computing node 500 in a reservation-based high-performance computing system according to this disclosure. For ease of explanation, the computing node 500 shown in FIG. 5 may be described as being used in the computing system 200 of FIGS. 2 and 3, which may include multiple instances of the computing cluster 100 in FIG. 1. For example, one or more instances of the computing node 500 may be used to at least partially implement each of the core computing resources and shared computing resources described above. However, each of these components may be implemented in any other suitable manner. Also, the computing node 500 shown in FIG. 5 may be used in any suitable system and with any suitable computing cluster(s).

As shown in FIG. 5, the computing node 500 denotes a computing device or system that includes at least one processing device 502, at least one storage device 504, at least one communications unit 506, and at least one input/output (I/O) unit 508. The processing device 502 may execute instructions that can be loaded into a volatile storage 510 or retrieved from a non-volatile storage 512. The processing device 502 includes any suitable number(s) and type(s) of processors or other processing devices in any suitable arrangement. Example types of processing devices 502 include one or more microprocessors, microcontrollers, digital signal processors (DSPs), application specific integrated circuits (ASICs), field programmable gate arrays (FPGAs), or discrete circuitry.

The volatile storage 510 and the non-volatile storage 512 are examples of storage devices 504, which represent any structure(s) capable of storing and facilitating retrieval of information (such as data, program code, and/or other suitable information on a temporary or permanent basis). The volatile storage 510 may represent a random access memory or any other suitable volatile storage device(s). The non-volatile storage 512 may contain one or more components or devices supporting longer-term storage of data, such as a hard drive, solid-state drive, or any other suitable non-volatile storage device(s). Note that the non-volatile storage 512 is shown here as being optional since certain components (such as the shared computing resources) may lack non-volatile storage.

The communications unit 506 supports communications with other systems or devices. For example, the communications unit 506 can include a network interface card or a wireless transceiver facilitating communications over a wired or wireless network. The communications unit 506 may support communications through any suitable physical or wireless communication link(s), such as one or more electrical, optical, or wireless communication links.

The I/O unit 508 allows for input and output of data. For example, the I/O unit 508 may provide a connection for user input through a keyboard, mouse, keypad, touchscreen, or other suitable input device. The I/O unit 508 may also send output to a display or other suitable output device. Note, however, that the I/O unit 508 may be omitted if the computing node 500 does not require local I/O, such as when the computing node 500 represents a server or other device that can be accessed remotely.

Although FIG. 5 illustrates one example of a computing node 500 in a reservation-based high-performance computing system, various changes may be made to FIG. 5. For example, computing and other data processing devices and systems come in a wide variety of configurations, and FIG. 5 does not limit this disclosure to any particular computing device or system.

Figure 6:
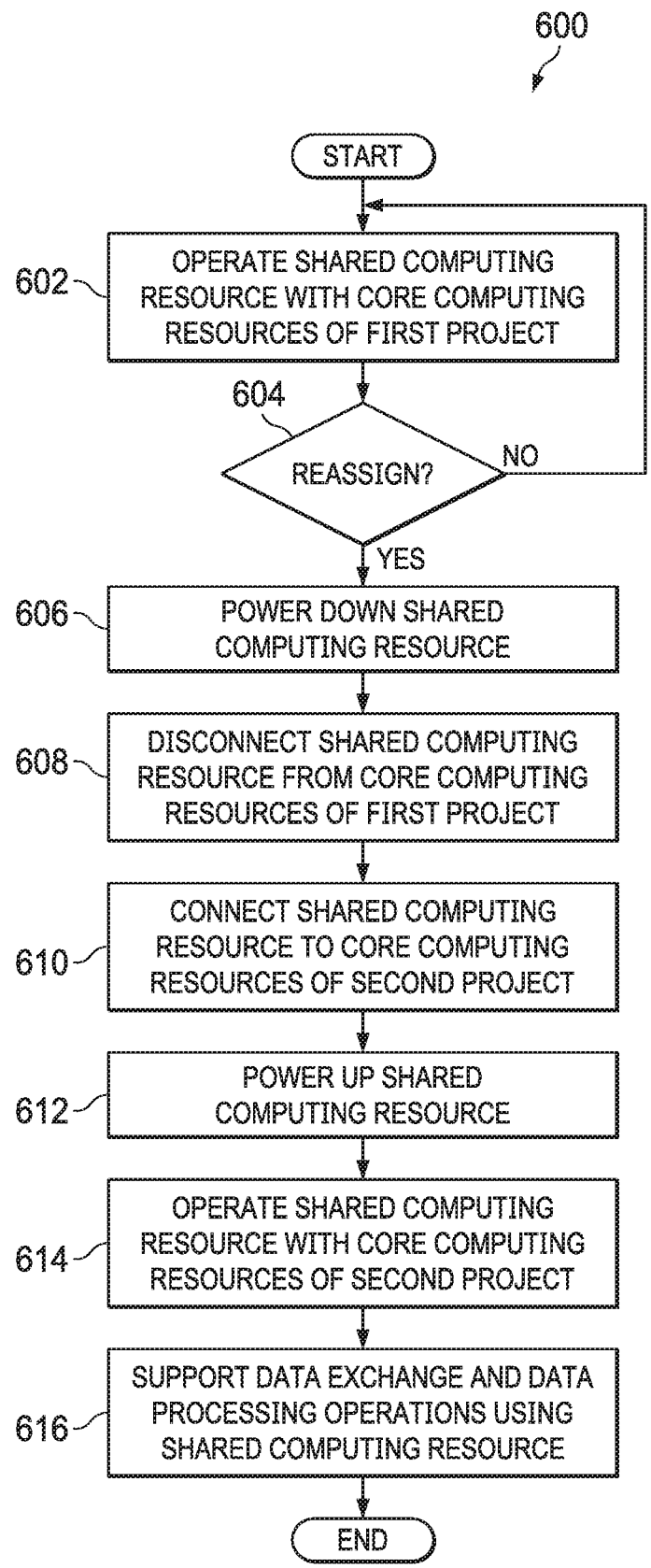
FIG. 6 illustrates an example method for reservation-based high-performance computing according to this disclosure.

FIG. 6 illustrates an example method 600 for reservation-based high-performance computing according to this disclosure. For ease of explanation, the method 600 shown in FIG. 6 may be described as involving the use of the computing system 200 of FIGS. 2 and 3, which may include multiple instances of the computing cluster 100 in FIG. 1. However, the method 600 shown in FIG. 6 may be used with any suitable system and with any suitable computing cluster(s).

As shown in FIG. 6, a shared computing resource is operated with core computing resources of a first project at step 602. This may include, for example, operating one or more working computing nodes 126 (such as one or more servers or graphics processing units) in the shared computing resources 106, 206a-206c for a specific project. The shared computing resource 106, 206a-206c here may perform any suitable data processing operations for the first project. A determination is made whether the shared computing resource is to be reassigned at step 604. This may include, for example, determining whether a reservation for the shared computing resource 106, 206a-206c by the first project is ending or a reservation for the shared computing resource 106, 206a-206c by another project is starting. If not, the first project may continue to use the shared computing resource 106, 206a-206c.

If the shared computing resource is being reassigned, the shared computing resource is powered down at step 606. This may include, for example, personnel powering down a rack 102, 202 that contains the shared computing resource 106, 206a-206c and inspecting the shared computing resource 106, 206a-206c to verify that it is no longer receiving power. The shared computing resource is disconnected from the core computing resources of the first project at step 608 and connected to core computing resources of a second project at step 610. This may include, for example, personnel switching or moving the appropriate cable(s) 128, 208 in order to decouple the shared computing resource 106, 206a-206c from the core computing resources 104, 204a-204c of the first project and to couple the shared computing resource 106, 206a-206c to the core computing resources 104, 204a-204c of the second project. The shared computing resource is powered back up at step 612. This may include, for example, personnel powering up the rack 102, 202 that contains the shared computing resource 106, 206a-206c and inspecting the shared computing resource 106, 206a-206c to verify that it is receiving power.

The shared computing resource is operated with the core computing resources of the second project at step 614, and data exchange and data processing operations of the second project are supported using the shared computing resource at step 616. This may include, for example, operating the shared computing resource 106, 206a-206c to perform any suitable data processing operations for the second project. At this point, the second project may continue to use the shared computing resource 106, 206a-206c until the shared computing resource 106, 206a-206c is reassigned (and the method 600 can be repeated to reassign the shared computing resource 106, 206a-206c again).

Although FIG. 6 illustrates one example of a method 600 for reservation-based high-performance computing, various changes may be made to FIG. 6. For example, while shown as a series of steps, various steps in FIG. 6 may overlap, occur in parallel, occur in a different order, or occur any number of times. Also, any number of shared computing resources may be assigned and reassigned as needed or desired between any number of projects.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   detecting, by a high-performance computing (HPC) management function, connection of a shared computing resource;
   communicatively coupling the shared computing resource to core computing resources associated with a first project, the core computing resources associated with the first project configured to use the shared computing resource to perform data processing operations associated with the first project;
   emulating, by the HPC management function, the shared computing resource as a local computing resource;
   reassigning the shared computing resource to a second project by:
      powering down the shared computing resource;
      disconnecting the shared computing resource from the core computing resources associated with the first project;
      communicatively coupling the shared computing resource to core computing resources associated with the second project; and
      powering up the shared computing resource, the core computing resources associated with the second project configured to use the shared computing resource to perform data processing operations associated with the second project; and
   determining, by the HPC management function, that the shared computing resource is no longer accessible for the first project;
   wherein the shared computing resource lacks non-volatile memory to store data related to the first and second projects;
   wherein the shared computing resource and the core computing resources associated with the first project collectively form at least part of a first computing cluster; and
   wherein the shared computing resource and the core computing resources associated with the second project collectively form at least part of a second computing cluster.

2. The method of claim 1, wherein:
   the shared computing resource comprises volatile memory used to store the data related to the first and second projects; and
   powering down the shared computing resource clears the volatile memory and prevents the data associated with the first project from being accessed by the core computing resources associated with the second project.

3. The method of claim 1, wherein:
   the shared computing resource comprises a diskless computing node; and
   the core computing resources associated with the second project comprise at least one management server that provides boot information to the diskless computing node.

4. The method of claim 1, wherein the core computing resources associated with the second project comprise at least one scratch server that at least one of: provides information to the shared computing resource and receives processing results from the shared computing resource.

5. The method of claim 4, wherein the core computing resources associated with the second project further comprise at least one session server that permits users to submit and monitor processing jobs for execution by the second computing cluster and to access the processing results in the at least one scratch server.

6. The method of claim 1, wherein:
the core computing resources associated with the second project comprise at least one management server that integrates the shared computing resource into a pool for use by the core computing resources associated with the second project;
the at least one management server comprises a job scheduler and a batch queueing system;
the job scheduler receives processing jobs submitted by users and provides the processing jobs to the batch queueing system; and
the batch queueing system assigns the processing jobs to particular computing resources including the shared computing resource for execution.

7. The method of claim 1, wherein the core computing resources associated with the second project comprise at least one dedicated computing node that lacks non-volatile memory to store data related to the second project.

8. The method of claim 1, further comprising:
storing processing results from the shared computing resource in a non-volatile storage in the core computing resources associated with the second project.

9. The method of claim 1, wherein:
the shared computing resource comprises one of a plurality of shared computing resources in a first set of shared computing resources;
the method further comprises communicatively coupling the first set of shared computing resources and at least one additional set of shared computing resources to the core computing resources associated with the first project and the core computing resources associated with the second project; and
different sets of shared computing resources comprise different types of computing nodes.

10. The method of claim 1, wherein the shared computing resource comprises at least one of: one or more servers and one or more graphics processing units.

11. A system comprising:
a shared computing resource;
core computing resources associated with a first project and comprising a first high-performance computing (HPC) management function configured to detect a connection to the shared computing resource and emulate the shared computing resource as a local computing resource in order to perform data processing operations associated with the first project; and
core computing resources associated with a second project comprising a second HPC management function and configured to detect a connection to the shared computing resource and emulate the shared computing resource as a local computing resource in order to perform data processing operations associated with the second project;
wherein the shared computing resource is configured to be communicatively coupled to the core computing resources associated with the first project, powered down and disconnected from the core computing resources associated with the first project, and communicatively coupled to the core computing resources associated with the second project and powered up to reassign the shared computing resource;
wherein the first HPC management function is configured to determine that the shared computing resource is no longer accessible for the first project while the shared computing resource is communicatively coupled to the core computing resources associated with the second project;
wherein the shared computing resource lacks non-volatile memory to store data related to the first and second projects;
wherein the shared computing resource and the core computing resources associated with the first project collectively form at least part of a first computing cluster; and
wherein the shared computing resource and the core computing resources associated with the second project collectively form at least part of a second computing cluster.

12. The system of claim 11, wherein:
the shared computing resource comprises volatile memory configured to store the data related to the first and second projects; and
the shared computing resource is configured such that powering down the shared computing resource clears the volatile memory and prevents the data associated with the first project from being accessed by the core computing resources associated with the second project.

13. The system of claim 11, wherein:
the shared computing resource comprises a diskless computing node; and
the core computing resources associated with the second project comprise at least one management server configured to provide boot information to the diskless computing node.

14. The system of claim 11, wherein the core computing resources associated with the second project comprise at least one scratch server configured to at least one of: provide information to the shared computing resource and receive processing results from the shared computing resource.

15. The system of claim 14, wherein the core computing resources associated with the second project further comprise at least one session server configured to permit users to submit and monitor processing jobs for execution by the second computing cluster and to access the processing results in the at least one scratch server.

16. The system of claim 11, wherein:
the core computing resources associated with the second project comprise at least one management server configured to integrate the shared computing resource into a pool for use by the core computing resources associated with the second project;
the at least one management server comprises a job scheduler and a batch queueing system;
the job scheduler is configured to receive processing jobs submitted by users and provide the processing jobs to the batch queueing system; and
the batch queueing system is configured to assign the processing jobs to particular computing resources including the shared computing resource for execution.

17. The system of claim 11, wherein the core computing resources associated with the second project comprise at least one dedicated computing node that lacks non-volatile memory to store data related to the second project.

18. The system of claim 11, wherein the core computing resources associated with the second project comprise a non-volatile storage configured to store processing results from the shared computing resource.

19. The system of claim 11, wherein the shared computing resource comprises at least one of: one or more servers and one or more graphics processing units.

20. A system comprising:
   multiple sets of core computing resources associated with and dedicated to different projects, each set of core computing resources configured to perform data processing operations; and
   multiple shared computing resources each configured to be selectively assigned to one of the different projects and to perform data processing operations for the assigned project;
   wherein each set of core computing resources comprises a high-performance computing (HPC) management function configured to detect a connection of one or more of the shared computing resources and emulate the one or more shared computing resources as one or more local computing resources in order to perform the data processing operations for the assigned project;
   wherein each shared computing resource is configured to be communicatively coupled to the set of core computing resources associated with a first of the projects, powered down and disconnected from the set of core computing resources associated with the first project, and communicatively coupled to the set of core computing resources associated with a second of the projects and powered up to reassign the shared computing resource;
   wherein each shared computing resource lacks non-volatile memory to store data related to the assigned project; and
   wherein each set of core computing resources and the shared computing resources communicatively coupled to that set of core computing resources form at least part of a computing cluster, each computing cluster being reconfigurable by changing the shared computing resources communicatively coupled to the set of core computing resources.

* * * * *